INVENTORS
HANS ADLER
NORMAN HOROWITZ
PHILIP SPIGNER
BY Samuel Stoll
ATTORNEY

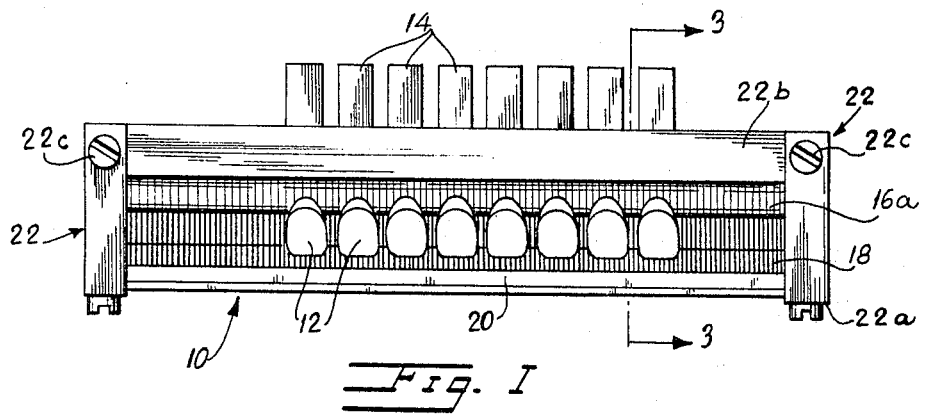
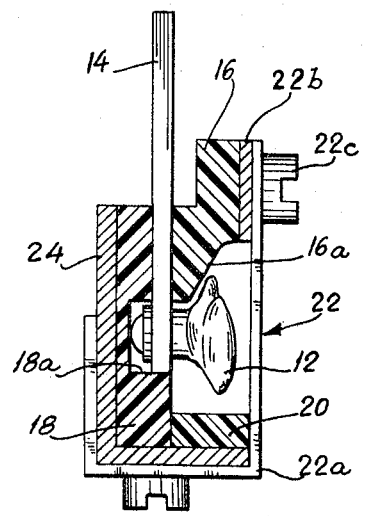
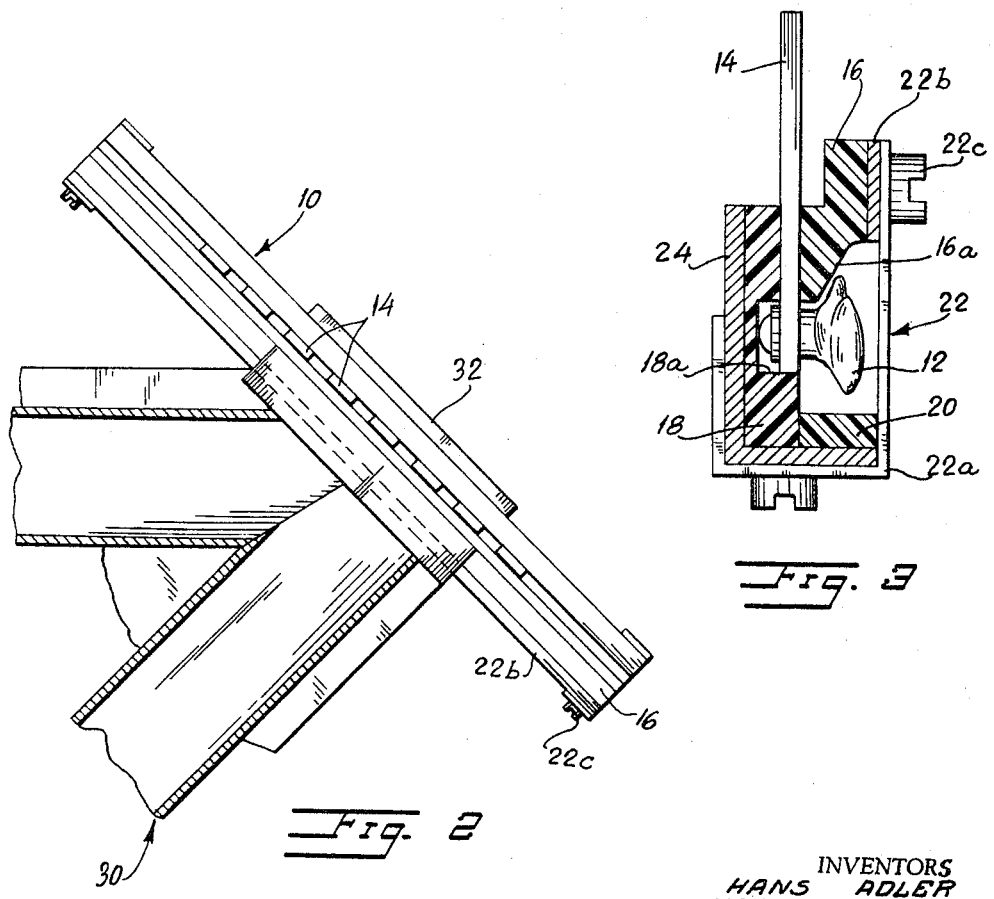

United States Patent Office 3,436,156
Patented Apr. 1, 1969

3,436,156
DENTAL COLOR MATCHING GUIDE
Hans Adler, 269 Riverside Drive, New York, N.Y. 10025; Norman Horowitz, 111—21 77th Road, Forest Hills, N.Y. 11375; and Philip Spigner, 1460 Park St., Atlantic Beach, N.Y. 11509
Filed Apr. 8, 1966, Ser. No. 541,383
Int. Cl. G01j 3/52
U.S. Cl. 356—192                              6 Claims This invention relates to a dental color matching guide used in the dental profession for matching natural and artificial teeth.

The present device is related to and may be used in conjunction with dental color and surface structure comparators of the kind disclosed in co-pending patent application, Ser. No. 541,384 filed on Apr. 8, 1966. The present invention is not limited to its use in conjunction with this particular color and surface structure comparator. It may be used with any comparator whose function is to match natural and artificial teeth. Nor is the present invention limited to the matching of teeth. It may be applied to the matching of natural and artificial gums.

For convenience, the present device may be designated as a color guide or, more particularly, a shade guide. The purpose of the invention is to serve as the means for matching the shades of natural and artificial teeth, as well as the shades of natural and artificial gums. Teeth are white and gums are pink, but there are many shades and variations of these colors.

The principal object of this invention is the provision of means for providing sample teeth in various tooth color shades against a simulated gum and oral background in various shades of pink. It has been found that unsatisfactory matching results are produced in the absence of background or environment color. Thus, teeth in the human mouth cannot effectively be matched against sample teeth in the absence of a gum color background.

The present invention provides a plurality of tooth samples in various shades of white, an upper background in various shades of gum tissue pink and an intermediate background in various shades of darker pink simulating an oral background (e.g., of tongue tissue) and a lower background in tooth color (a shade of white) simulating the opposing teeth in the human mouth. The various tooth samples are thus presented in a frame of appropriate backgrounds. Four color or shade groupings are accordingly provided, and each may be movably adjustable relative to the others, to permit of a great variety of combinations to correspond to virtually every mouth color combination encountered in the practice of dentistry. It will also be understood that the present invention provides a color guide wherein the sample teeth vary in shade against simulated gum and oral backgrounds which do not vary in shade. In such case there would be no need for relative adjustment between the sample teeth and the gum and tongue backgrounds.

The present invention is disclosed in two forms, one linear and the other rotary. In the former case, the color guide is adjustable longitudinally of itself in a straight or linear path. In the latter case the color guide is angularly adjustable about a fixed axis. These forms of the invention are purely illustrative of the principles of the invention and should not be construed as limiting the scope of this application and of the appended claims to linear and rotary forms.

In these and all other cases the color guide comprises a plurality of sample or simulated teeth and a background of a simulated gum, and preferably, the additional backgrounds of a simulated oral section and simulated opposing teeth, a mounting for said sample teeth and backgrounds, and a housing for said mounting. The housing is provided with a window through which the sample teeth and backgrounds may be viewed, and the mounting is adjustably movable relative to said window to register and expose selected sample teeth through said window or through a viewing portion thereof. The housing is fixed (permanently or detachably) relative to the color comparator so as to insure proper registration of the housing window with the color comparator and a predetermined angular position relative thereto.

The effective portions of the color guide may be either three-dimensional or two-dimensional as desired or required. In the preferred form of the invention the sample teeth are three-dimensional, and this is equally true of the simulated gum background. Nevertheless, the invention also contemplates the use of plane surfaces as the effective color components.

The invention is illustrated in the accompanying drawing, in which:

FIGURE 1 is a face view of a linear type of color guide made in accordance with the principles of this invention.

FIGURE 2 is a plan view of said linear type of color guide, showing it in operative position with respect to a color comparator.

FIGURE 3 is a transverse section on the line 3—3 of FIGURE 1.

Figure 4:
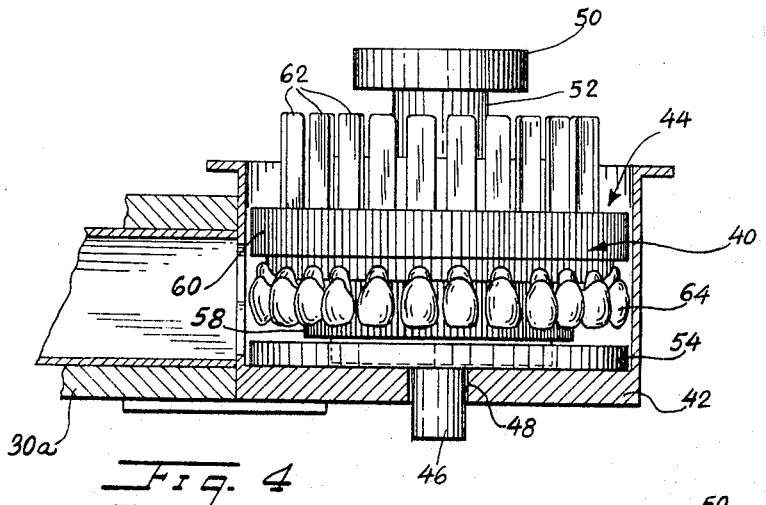
FIGURE 4 is a face view, partly in section, of a rotary type of color guide made in accordance with the principles of this invention.

Referring now to the first form of this invention, and to FIGURES 1, 2, and 3, it will be observed that color guide 10 comprises a plurality of samples 12 or artificial teeth, individual mountings 14 for said teeth, a background bar 16 mounted behind and above said teeth, a second background bar 18 mounted behind and below said teeth, a third background bar 20 mounted beneath the teeth, and a frame 22 which holds these several components together.

More particularly, sample teeth 12 are riveted or otherwise affixed to the lower ends of mountings 14 which in the disclosed forms of this invention are vertically extending plastic or metal sticks. It will be observed that these sticks are clamped between upper background bar 16 and lower background bar 18. A ledge 18a is provided within a longitudinal groove formed in lower background bar 18, to support the lower ends of sticks 14 and thereby to position and align the several sample teeth mounted thereon.

Upper background bar 16 is colored pink to simulate the color of natural gums. Its face 16a is contoured to simulate a gum structure, being somewhat tapered to extend downwardly behind the sample teeth and upwardly above and forward of the sample teeth. The second background bar 18 is colored a darker pink, to simulate the oral background. The third background bar 20 has a medium tooth color, simulating or producing the effect of an opposing set of teeth.

It will be observed that all three background bars are positioned within an angle bar 24 which is mounted within frame 22. In the preferred form of this embodiment of the invention frame 22 is a spring element comprising a pair of J-shaped end portions 22a and a horizontal bar 22b joining said J-shaped end portions. Screws 22c secure the J-shaped end portions to the horizontal bar.

It will further be understood that the several background bars 16, 18 and 20 are longitudinally shiftable relative to each other, and sticks 14 are similarly shiftable relative to each other longitudinally of said background bars. These several components are held together in fixed positions by the spring tension of J-shaped spring elements 22a.

The manner in which color guide 10 is used is shown in FIGURE 2, wherein the color guide shown to be adjustably attached to a color comparator 30 of the type shown, for example, in co-pending patent application, Ser. No. 456,785 above mentioned. A channel-shaped support 32 is attached to the color comparator 30 to support the color guide 10 in slidable relation thereto. The color guide is shown to be slidably movable longitudinally of itself, in order to expose selected sample teeth 12 to the color comparator.

Figure 6:
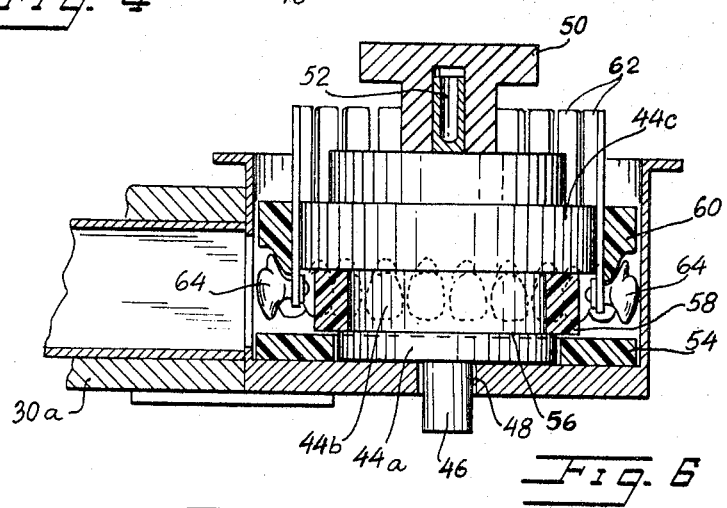
FIGURE 6 is a section on the line 6—6 of FIGURE 5.
Figure 5:
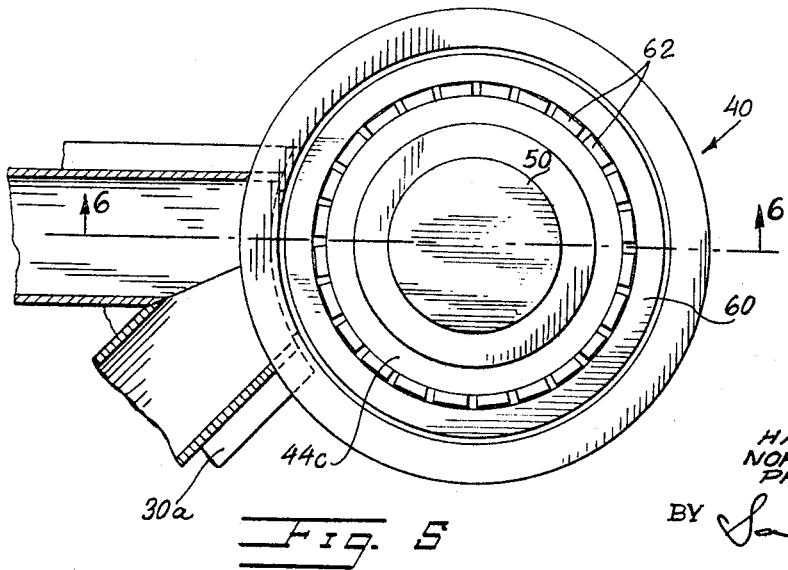
FIGURE 5 is a plan view of said color guide, showing it in operative position with respect to a color comparator.

Referring now to the second form of this invention, as illustrated in FIGURES 4, 5 and 6, it will be observed that rotary color guide 40 is housed within a cylindrical receptacle 42 which is attached to a color comparator 30a such as is illustrated in co-pending patent application Ser. No. 456,785 above mentioned. Rotatably mounted within said holder 42 is a turntable 44 having a centrally disposed stud shaft 46 journaled into a hole 48 formed in the bottom wall of receptacle 42. This positions the turntable, while permitting it to rotate within the cylindrical receptacle. To facilitate rotating the turntable, a knob 50 is secured thereto by means of a post 52.

The turntable is provided with three cylindrical portions 44a, 44b and 44c, respectively, cylindrical portion 44a being the lowermost section which would support the turntable on the bottom wall of receptacle 40. Surrounding said cylindrical portion 44a is a tooth-colored ring 54 to produce the effect of a set of opposing teeth. Cylindrical portion 44b is situated above cylindrical portion 44a, and it will be observed in FIGURE 6 that it is of slightly smaller diameter to provide an annular ledge 56 along the peripheral edge of cylindrical section 44a. Encircling cylindrical section 44b and resting on said annular ledge 56 is a second ring 58 which is colored a dark pink to simulate an oral background.

Cylindrical section 44c surmounts cylindrical section 44b, and it will be observed that section 44c is of relatively large diameter which extends below the outer periphery of ring 58 as FIGURE 6 clearly shows. A third ring 60 encircles cylindrical section 44c and clamps a plurality of sticks 62 against said cylindrical section 44c. Ring 60 is colored pink to simulate the gum tissue, and it will be noted that it is contoured along its outer lower peripheral edge to correspond to the contours of the gum in a patient's mouth.

At the lower end of sticks 62 are artificial teeth 64 which may be secured thereto by any suitable means, as for example rivets or adhesive or any other conventional fastening means.

It will now be observed that rings 54, 58 and 60 of the second form of the invention correspond, respectively, to bars 20, 18 and 16 of the first form of the invention. Similarly, sticks 62 and artificial teeth 64 mounted thereon correspond to sticks 14 and artificial teeth 12 in the first form of the invention. It is evident that in both forms of the invention the same principle obtains, namely, the mounting of a plurality of artificial teeth against a background simulating conditions in the human mouth and including a pink simulated gum section, a somewhat darker pink simulated oral background, and a tooth-colored section simulating opposing teeth. In both bases the sample teeth are adjustably mounted relative to the color comparator with which they are used.

It will now be understood that the principle which this application seeks to protect is that of providing a plurality of sample teeth of different shades against a natural color background representing adjacent portions of the oral background and opposing teeth. The main ingredient is the simulated gum background. Next in importance is the simulated oral background. The simulated opposing teeth background is of least importance. The color guide may be used with only a simulated gum tissue background. It is even more effectively used when a simulated oral background is added. There is further improvement when a background simulating opposing teeth is added.

It follows that the precise nature of the tooth specimens is not critical. Any conventional series of tooth specimens may be used in connection with this invention, as well as any suitable mounting therefor.

The foregoing is illustrative of preferred forms of this invention, and it will be readily understood that these forms may be modified and other forms may be provided within the basic principles of the invention and the scope of the claims. For example, the several operative parts of the color guide (exclusive of the housing) may be fixed or adjustably movable relative to each other. Thus, the sample teeth may be fixed or movable with respect to the simulated gum and oral backgrounds. When these backgrounds are uniform in color, there is no advantage to be gained in making the parts adjustably movable with respect to each other. However, these variations in shade may be incorporated into these background elements and in such case it would be advantageous to provide for adjustment of the sample teeth relative to the gum and oral backgrounds.

In the foregoing discussion of the invention, the matching samples are described in terms of a plurality of teeth. This, however, is not essential, since the matching sample may comprise a single sample tooth. Stated differently, a plurality of individual matching samples may be provided, each to be used separately and independently, and each having its own distinctive color and surface structure features. The use of individual tooth samples is especially convenient for the matching of individual teeth, both natural and artificial.

Accordingly, the invention which is herein described and claimed, should be understood as encompassing all forms of sample teeth, whether mounted and used separately and individually or in groups or series.

What is claimed is:

1. A dental color matching guide comprising a plurality of sample teeth and a simulated gum background therefor, a mounting provided for said sample teeth and simulated gum background, and a housing provided for said mounting, said housing having a window formed therein and said mounting being adjustably movable relative to said window to expose selected sample teeth through said window, the housing being a generally cylindrical receptacle and the mounting being a turntable rotatably mounted in said housing coaxially therewith, said sample teeth being arranged circumferentially of said turntable, and said window being formed in the cylindrical side wall of said housing, whereby the turntable may be rotated within the housing to selectively position the sample teeth in registration with said window, the simulated gum background consisting of a gum-colored annular member mounted on said turntable concentrically therewith and adjacent to and concentrically with the sample teeth mounted on said turntable.

2. A dental color matching guide comprising a plurality of sample teeth and a simulated gum background therefor, a mounting provided for said sample teeth and simulated gum background, and a housing provided for said mounting, said housing having a window formed therein and said mounting being adjustably movable relative to said window to expose selected sample teeth through said window, the housing being a generally cylindrical receptacle and the mounting being a turntable rotatably mounted in said housing coaxially therewith, said sample teeth being arranged circumferentially of said turntable, and said window being formed in the cylindrical side wall of said housing, whereby the turntable may be rotated within the housing to selectively position the sample teeth in registration with said window, a simulated oral background provided adjacent the sample teeth, said simulated oral background consisting of a dark-pink colored annular member mounted on the turntable concentrically therewith and with the sample teeth.

3. A dental color matching guide in accordance with claim 1, wherein a simulated oral background and a simulated opposing teeth background are both provided in addition to a simulated gum background, said simulated oral background comprising a dark-pink colored annular member mounted on the turntable in concentric relation to said sample teeth and said gum-colored annular member, said simulated opposing teeth background comprising a tooth-colored annular member mounted on said turntable in concentric relation to said sample teeth, gum-colored annular member and dark-pink colored annular member simulating the oral background.

4. A dental color matching guide comprising a plurality of sample teeth and a simulated gum background therefor, a mounting provided for said sample teeth and simulated gum background, and a housing provided for said mounting, said housing having a window formed therein and said mounting being adjustably movable relative to said window to expose selected sample teeth through said window, the housing being a generally linearly elongated receptacle and the mounting being slidably mounted therein for movement longitudinally thereof, said sample teeth being arranged in a row in side-by-side relationship longitudinally of said mounting and facing the window which is formed in said housing whereby the mounting may be moved longitudinally of the housing to selectively position the sample teeth with respect to said window, and the simulated gum background consisting of a gum-colored bar mounted adjacent the row of said sample teeth in parallel relationship thereto.

5. A dental color matching guide comprising a plurality of sample teeth and a simulated gum background therefor, a mounting provided for said sample teeth and simulated gum background, and a housing provided for said mounting, said housing having a window formed therein and said mounting being adjustably movable relative to said window to expose selected sample teeth through said window, the housing being a generally linearly elongated receptacle and the mounting being slidably mounted therein for movement longitudinally thereof, said sample teeth being arranged in a row in side-by-side relationship longitudinally of said mounting and facing the window which is formed in said housing whereby the mounting may be moved longitudinally of the housing to selectively position the sample teeth with respect to said window, and a simulated oral background, in the form of a dark-pink colored bar, being provided adjacent and in parallel relationship to said row of sample teeth.

6. A dental color matching guide in accordance with claim 4, wherein a simulated oral background and a simulated opposing teeth background are both provided in addition to the simulated gum background, said simulated oral and opposing teeth backgrounds comprising, respectively, a pair of dark-pink and tooth-colored bars being mounted adjacent the row of sample teeth in parallel relationship thereto.

References Cited
UNITED STATES PATENTS 2,333,795  11/1943  Kellerman et al.
2,805,478  9/1957  Adams.

OTHER REFERENCES

Myerson: J. Am. Dental Assoc., v. 27, Aug. 8, 1940, pp. 14–15.

JEWELL H. PEDERSEN, *Primary Examiner.*

WARREN A. SKLAR, *Assistant Examiner.*

U.S. Cl. X.R.

32—71; 35—28.3; 356—194